(12) United States Patent
Won

(10) Patent No.: US 11,877,224 B2
(45) Date of Patent: *Jan. 16, 2024

(54) METHOD, APPARATUS AND COMPUTER PROGRAM

(71) Applicant: NOKIA TECHNOLOGIES OY, Espoo (FI)

(72) Inventor: Sung Hwan Won, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,910

(22) Filed: Dec. 27, 2022

(65) Prior Publication Data
US 2023/0130168 A1   Apr. 27, 2023

Related U.S. Application Data

(63) Continuation of application No. 17/281,394, filed as application No. PCT/EP2018/077205 on Oct. 5, 2018, now Pat. No. 11,570,608.

(51) Int. Cl.
*H04W 4/90* (2018.01)
*H04W 76/38* (2018.01)
*H04W 76/50* (2018.01)

(52) U.S. Cl.
CPC ............. *H04W 4/90* (2018.02); *H04W 76/38* (2018.02); *H04W 76/50* (2018.02)

(58) Field of Classification Search
CPC ........ H04W 4/90; H04W 76/38; H04W 76/50
See application file for complete search history.

(56) References Cited

U.S. PATENT DOCUMENTS

| 2013/0107811 | A1 | 5/2013 | Watfa et al. |
| 2015/0063315 | A1 | 3/2015 | Yang et al. |
| 2015/0140948 | A1 | 5/2015 | Tiwari |
| 2015/0172962 | A1 | 6/2015 | Watfa et al. |
| 2016/0135049 | A1 | 5/2016 | Banaudha et al. |
| 2018/0049043 | A1 | 2/2018 | Hoffberg |
| 2020/0015128 | A1 | 1/2020 | Stojanovski et al. |
| 2020/0305032 | A1 | 9/2020 | Kuppelur et al. |

(Continued)

FOREIGN PATENT DOCUMENTS

| CN | 102893668 A | 1/2013 |
| CN | 105472674 A | 4/2016 |

(Continued)

OTHER PUBLICATIONS

ETSI TS 124 501 V15.0.0 (Jul. 2018) "5G; Non-Access-Stratum (NAS) protocol for 5G System (5GS); Stage 3 (3GPP TS 24.501 version 15.0.0 Release 15)" Jul. 2018.(https://www.etsi.org/deliver/etsi_ts/124500_124599/124501/15.00.00_60/ts_124501v150000p.pdf) (Year: 2018).

(Continued)

*Primary Examiner* — Minjung Kim
(74) *Attorney, Agent, or Firm* — SQUIRE PATTON BOGGS (US) LLP

(57) ABSTRACT

An apparatus comprising means for performing: determining an expiration of a service request timer generated in association with a service request message from the apparatus; and handling the expiration of the service request timer based on a determination of a service type of the service request message.

13 Claims, 8 Drawing Sheets

(56) References Cited

U.S. PATENT DOCUMENTS

2021/0176672 A1    6/2021    Velev et al.
2021/0345194 A1    11/2021    Futaki et al.

FOREIGN PATENT DOCUMENTS

CN           108353353 A     7/2018
WO         2016/073346 A1   5/2016

OTHER PUBLICATIONS

First Examination Report dated May 26, 2022 corresponding to Indian Patent Application No. 202147020200.

Notification of Ground of Rejection dated May 31, 2022 corresponding to Japanese Patent Application No. 2021-517935 with English translation thereof.

3GPP TS 24.501 V15.1.0 (Sep. 2018), Technical Specification, 3rd Generation Partnership Project; Technical Specification Group Core Network and Terminals; Non-Access-Stratum (NAS) protocol for 5G System (5GS); Stage 3 (Release 15), Sep. 2018.

Notification of the First Office Action dated Feb. 9, 2022 corresponding to Chinese Patent Application No. 2018800998989, with English summary thereof.

3GPP TS 23.502 V15.1.0 (Mar. 2018), Technical Specification, 3rd Generation Partnership Project; Technical Specification Group Services and System Aspects; Procedures for the 5G System; Stage 2 (Release 15), Mar. 2018.

Second Office Action dated May 27, 2021, corresponding to Bangladesh Patent Application No. 281/2019.

International Search Report and Written Opinion dated Jun. 26, 2019 corresponding to International Patent Application No. PCT/EP2018/077205.

ZTE, "Service request for emergency service," 3GPP Draft; C1-180124, 3GPP TSG-CT WG1 Meeting #108, Gothenburg, Sweden, Jan. 15, 2018, XP051383239.

Huawei et al: "General for 5GSM procedures," 3GPP Draft; C1-183755, 3GPP TSG-CT WG1 Meeting #111, Osaka, Japan, May 28, 2018, XP051459819.

Communication pursuant to Article 94(3) EPC dated Mar. 13, 2023, corresponding to European Patent Application No. 18783455.1.

Indonesian Office Action, with full English translation, corresponding to ID Application No. P00202102990, dated Apr. 12, 2023.

Figure 7

701 — UE attempts to select NR cell connected to 5GCN or UE attempts to select E-UTRA cell connected to 5GCN or UE attempts to select E-UTRA cell connected to EPC
Based on at least one of the following:
(1) Emergency services support indicator for 3GPP Access
(2) Radio Access Technology of current Cell (E-UTRA or NR)
(3) UE's capability to access 5GCN via E-UTRA
(4) UE's support for S1 mode
(5) Availability of a suitable NR cell or E-UTRA cell connected to 5GCN or E-UTRA cell connected to EPC
(6) the emergency service fallback indicator for 3GPP access

608 — IF UE finds suitable NR or E-UTRA cell connected to 5GCN or E-UTRA cell connected to EPC
- Proceed with 5GMM specific procedures and 5gSM procedures to make emergency PDU session
- Proceed with EMM specific procedures (and if needed ESM procedures) to make PDN connection for emergency bearer services

309

METHOD, APPARATUS AND COMPUTER PROGRAM

CROSS-REFERENCE TO RELATED APPLICATION

This application is a Continuation of co-pending U.S. patent application Ser. No. 17/281,394, filed on Mar. 30, 2021, which is the National Stage of PCT International Application No. PCT/EP2018/077205, filed on Oct. 5, 2018. The entire content of the above-referenced applications is hereby incorporated by reference.

TECHNICAL FIELD

Various examples relate to a method, apparatus and a computer program. More particularly, various examples relate to a handling of abnormal cases in a user equipment (UE) in service requests to a 5G network.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

One of the aspects of 5G relates to a Service request procedure. A Service request procedure specifies change of the 5GMM (5GS Mobility Management) mode from IDLE to CONNECTED and the corresponding request to establish user-plane resources.

In this case the UE is configured to transmit a "SERVICE REQUEST" message to the network side. Standard causes for starting the procedure are, for example, when UE or network have signalling or user data pending and UE is in a 5GMM-IDLE mode. However, this procedure may also be invoked when the UE receives a request for emergency services fallback (ESFB) from the upper layer and performs ESFB.

Emergency services fallback (ESFB) data sessions may be established between devices for important communications, for example for calls to an ambulance, police or fire service.

SUMMARY

According to a first aspect, there is provided an apparatus comprising means for: determining an expiration of a service request timer generated in association with a service request message from the apparatus; and handling the expiration of the service request timer based on a determination of a service type of the service request message.

The means for handling the expiration of the service request timer based on a determination of a service type of the service request message may be further for: initiating at least one emergency service access when the service type of the service request message is an emergency service fallback type; and handing the expiration of the service request timer otherwise.

The means for handling the expiration of the service request timer based on a determination of a service type of the service request message may be further for: determining the service type of the service request message is an emergency service fallback type; determining the apparatus is camping on an new radio cell connected to a 5G core network, an emergency services support indicator for access indicates that emergency services are supported for evolved universal terrestrial radio access connections to the 5G core network only and the apparatus is capable of accessing the 5G core network via the evolved universal terrestrial radio access; attempting to select an evolved universal terrestrial radio cell connected to the 5G core network based on the determining; and attempting to select an evolved universal terrestrial radio cell connected to an evolved packet node when the apparatus is unable to select an evolved universal terrestrial radio cell connected to the 5G core network based on the determining and the apparatus is configured to support access via an evolved packet node (S1 mode).

The means for handling the expiration of the service request timer based on a determination of a service type of the service request message may be further for: determining the service type of the service request message is an emergency service fallback type; determining the apparatus is camping on an evolved universal terrestrial radio access cell connected to a 5G core network, an emergency services support indicator for access indicates that emergency services are supported for new radio access connections to the 5G core network only and the apparatus is capable of accessing the 5G core network via a new radio access; attempting to select a new radio cell connected to the 5G core network based on the determining; and attempting to select an evolved universal terrestrial radio cell connected to an evolved packet node when the apparatus is unable to select a new radio cell connected to the 5G core network based on the determining and the apparatus is configured to support access via an evolved packet node (S1 mode).

The means for handling the expiration of the service request timer based on a determination of a service type of the service request message may be further for: determining the service type of the service request message is an emergency service fallback type; attempting to select one of: a new radio cell connected to the 5G core network; an evolved universal terrestrial radio cell connected to the 5G core network; and evolved universal terrestrial radio cell connected to an evolved packet node based on determining the service type of the service request message is an emergency service fallback type and further based on at least one of: an emergency services support indicator for 3GPP access; a radio access technology of the apparatus current cell (evolved universal terrestrial radio or new radio); a capability to access 5G core network via CN via evolved universal terrestrial radio access; support for access via an evolved packet node (S1 mode); availability of a suitable new radio cell connected to the 5G core network, evolved universal terrestrial radio access cell connected to the 5G core network, or evolved universal terrestrial radio access cell connected to an evolved packet node; and an emergency service fallback indicator for 3GPP access.

The means for handling the expiration of the service request timer based on a determination of a service type of the service request message may be further for: performing 5G mobility management specific procedures and 5G service management procedures to make an emergency packet data unit session based determining a suitable selection of the new radio cell connected to the 5G core network or the evolved universal terrestrial radio cell connected to the 5G core network; or performing evolved mobility management specific procedures and evolved service management procedures to make an packet data node connection for emergency bearer services based on determining a suitable selection of the evolved universal terrestrial radio cell connected to the evolved packet node.

The means for handling the expiration of the service request timer based on a determination of a service type of the service request message may be further for handling the expiration of the service request timer based on a mobility management mode.

The means for handling the expiration of the service request timer based on a determination of a service type of the service request message and a mobility management mode may be further for: determining the mobility management mode is an idle mobility management mode and the service type of the service request message is other than an emergency service fallback type, and based on the determining: aborting the service request procedure; releasing locally any allocated resources; selectively incrementing a service request counter, wherein the service request counter is not incremented where the service request procedure is configured to establish a packet data unit session for emergency services, or the apparatus has an established packet data unit session for emergency services, or the apparatus is configured for high priority access, or the service request was in response to a page or notification from a network; based on the service request counter being equal or greater a determined threshold value performing: starting a further timer, wherein the apparatus is configured not to attempt a further service request until an expiration of the further timer unless at least one of: the further service request is in response to a page or notification from a network; the apparatus is configured for high priority access; the further service request is configured to establish a packet data unit session for emergency services; the apparatus has an established packet data unit session for emergency services; the apparatus is registered in a new public land mobile network; and providing to at least one upper layer a notification that the service request was not accepted where the service request was for a management object multimedia telephony voice call.

The means for handling the expiration of the service request timer based on a determination of a service type of the service request message and a mobility management mode may be further for: determining the mobility management mode is an connected mobility management mode and the service type of the service request message is other than an emergency service fallback type, and based on the determining: aborting the service request procedure; and setting the apparatus mobility management mode to a connected mode.

The means may be further for: initiating a service request timer with a defined length value, wherein the defined length value is based on the determination of the service type of the service request message. The apparatus may be a user equipment.

According to a second aspect, there is provided an apparatus comprising at least one processor; and at least one memory including computer program; the at least one memory and the computer program code configured to, with the at least one processor, cause the apparatus at least to perform: determining an expiration of a service request timer generated in association with a service request message from the apparatus; and handling the expiration of the service request timer based on a determination of a service type of the service request message.

The apparatus caused to perform handling the expiration of the service request timer based on a determination of a service type of the service request message may be further caused to perform: initiating at least one emergency service access when the service type of the service request message is an emergency service fallback type; and handing the expiration of the service request timer otherwise.

The apparatus caused to perform handling the expiration of the service request timer based on a determination of a service type of the service request message may be further caused to perform: determining the service type of the service request message is an emergency service fallback type; determining the apparatus is camping on an new radio cell connected to a 5G core network, an emergency services support indicator for access indicates that emergency services are supported for evolved universal terrestrial radio access connections to the 5G core network only and the apparatus is capable of accessing the 5G core network via the evolved universal terrestrial radio access; attempting to select an evolved universal terrestrial radio cell connected to the 5G core network based on the determining; and attempting to select an evolved universal terrestrial radio cell connected to an evolved packet node when the apparatus is unable to select an evolved universal terrestrial radio cell connected to the 5G core network based on the determining and the apparatus is configured to support access via an evolved packet node (S1 mode).

The apparatus caused to perform handling the expiration of the service request timer based on a determination of a service type of the service request message may be further caused to perform: determining the service type of the service request message is an emergency service fallback type; determining the apparatus is camping on an evolved universal terrestrial radio access cell connected to a 5G core network, an emergency services support indicator for access indicates that emergency services are supported for new radio access connections to the 5G core network only and the apparatus is capable of accessing the 5G core network via a new radio access; attempting to select a new radio cell connected to the 5G core network based on the determining; and attempting to select an evolved universal terrestrial radio cell connected to an evolved packet node when the apparatus is unable to select a new radio cell connected to the 5G core network based on the determining and the apparatus is configured to support access via an evolved packet node (S1 mode).

The apparatus caused to perform handling the expiration of the service request timer based on a determination of a service type of the service request message may be further caused to perform: determining the service type of the service request message is an emergency service fallback type; attempting to select one of: a new radio cell connected to the 5G core network; an evolved universal terrestrial radio cell connected to the 5G core network; and evolved universal terrestrial radio cell connected to an evolved packet node based on determining the service type of the service request message is an emergency service fallback type and further based on at least one of: an emergency services support indicator for 3GPP access; a radio access technology of the apparatus current cell (evolved universal terrestrial radio or new radio); a capability to access 5G core network via CN via evolved universal terrestrial radio access; support for access via an evolved packet node (S1 mode); availability of a suitable new radio cell connected to the 5G core network, evolved universal terrestrial radio access cell connected to the 5G core network, or evolved universal terrestrial radio access cell connected to an evolved packet node; and an emergency service fallback indicator for 3GPP access.

The apparatus caused to perform handling the expiration of the service request timer based on a determination of a service type of the service request message may be further caused to perform: performing 5G mobility management specific procedures and 5G service management procedures to make an emergency packet data unit session based determining a suitable selection of the new radio cell connected to the 5G core network or the evolved universal terrestrial radio cell connected to the 5G core network; or performing evolved mobility management specific procedures and evolved service management procedures to make an packet data node connection for emergency bearer services based on determining a suitable selection of the evolved universal terrestrial radio cell connected to the evolved packet node.

The apparatus caused to perform handling the expiration of the service request timer based on a determination of a service type of the service request message may be further caused to perform handling the expiration of the service request timer based on a mobility management mode.

The apparatus caused to perform handling the expiration of the service request timer based on a determination of a service type of the service request message and a mobility management mode may be further caused to perform: determining the mobility management mode is an idle mobility management mode and the service type of the service request message is other than an emergency service fallback type, and based on the determining: aborting the service request procedure; releasing locally any allocated resources; selectively incrementing a service request counter, wherein the service request counter is not incremented where the service request procedure is configured to establish a packet data unit session for emergency services, or the apparatus has an established packet data unit session for emergency services, or the apparatus is configured for high priority access, or the service request was in response to a page or notification from a network; based on the service request counter being equal or greater a determined threshold value performing: starting a further timer, wherein the apparatus is configured not to attempt a further service request until an expiration of the further timer unless at least one of: the further service request is in response to a page or notification from a network; the apparatus is configured for high priority access; the further service request is configured to establish a packet data unit session for emergency services; the apparatus has an established packet data unit session for emergency services; the apparatus is registered in a new public land mobile network; and providing to at least one upper layer a notification that the service request was not accepted where the service request was for a management object multimedia telephony voice call.

The apparatus caused to perform handling the expiration of the service request timer based on a determination of a service type of the service request message and a mobility management mode may be further caused to perform: determining the mobility management mode is an connected mobility management mode and the service type of the service request message is other than an emergency service fallback type, and based on the determining: aborting the service request procedure; and setting the apparatus mobility management mode to a connected mode.

The apparatus may be caused to further perform: initiating a service request timer with a defined length value, wherein the defined length value is based on the determination of the service type of the service request message.

The apparatus may be a user equipment.

According to a third aspect there is provided an apparatus comprising: service request timer circuitry configured to perform determining an expiration of a service request timer generated in association with a service request message from the apparatus; and service request timer expiration circuitry configured to perform handling the expiration of the service request timer based on a determination of a service type of the service request message.

According to a fourth aspect there is provided a method comprising: determining an expiration of a service request timer generated in association with a service request message from an apparatus; and handling the expiration of the service request timer based on a determination of a service type of the service request message.

Handling the expiration of the service request timer based on a determination of a service type of the service request message may further comprise: initiating at least one emergency service access when the service type of the service request message is an emergency service fallback type; and handing the expiration of the service request timer otherwise.

Handling the expiration of the service request timer based on a determination of a service type of the service request message may further comprise: determining the service type of the service request message is an emergency service fallback type; determining the apparatus is camping on an new radio cell connected to a 5G core network, an emergency services support indicator for access indicates that emergency services are supported for evolved universal terrestrial radio access connections to the 5G core network only and the apparatus is capable of accessing the 5G core network via the evolved universal terrestrial radio access; attempting to select an evolved universal terrestrial radio cell connected to the 5G core network based on the determining; and attempting to select an evolved universal terrestrial radio cell connected to an evolved packet node when the apparatus is unable to select an evolved universal terrestrial radio cell connected to the 5G core network based on the determining and the apparatus is configured to support access via an evolved packet node (S1 mode).

Handling the expiration of the service request timer based on a determination of a service type of the service request message may further comprise: determining the service type of the service request message is an emergency service fallback type; determining the apparatus is camping on an evolved universal terrestrial radio access cell connected to a 5G core network, an emergency services support indicator for access indicates that emergency services are supported for new radio access connections to the 5G core network only and the apparatus is capable of accessing the 5G core network via a new radio access; attempting to select a new radio cell connected to the 5G core network based on the determining; and attempting to select an evolved universal terrestrial radio cell connected to an evolved packet node when the apparatus is unable to select a new radio cell connected to the 5G core network based on the determining and the apparatus is configured to support access via an evolved packet node (S1 mode).

Handling the expiration of the service request timer based on a determination of a service type of the service request message may further comprise: determining the service type of the service request message is an emergency service fallback type; attempting to select one of: a new radio cell connected to the 5G core network; an evolved universal terrestrial radio cell connected to the 5G core network; and evolved universal terrestrial radio cell connected to an evolved packet node based on determining the service type of the service request message is an emergency service fallback type and further based on at least one of: an emergency services support indicator for 3GPP access; a radio access technology of the apparatus current cell (evolved universal terrestrial radio or new radio); a capability to access 5G core network via CN via evolved universal terrestrial radio access; support for access via an evolved packet node (S1 mode); availability of a suitable new radio cell connected to the 5G core network, evolved universal terrestrial radio access cell connected to the 5G core network, or evolved universal terrestrial radio access cell connected to an evolved packet node; and an emergency service fallback indicator for 3GPP access.

Handling the expiration of the service request timer based on a determination of a service type of the service request message may further comprise: performing 5G mobility management specific procedures and 5G service management procedures to make an emergency packet data unit session based determining a suitable selection of the new radio cell connected to the 5G core network or the evolved universal terrestrial radio cell connected to the 5G core network; or performing evolved mobility management specific procedures and evolved service management procedures to make an packet data node connection for emergency bearer services based on determining a suitable selection of the evolved universal terrestrial radio cell connected to the evolved packet node.

Handling the expiration of the service request timer based on a determination of a service type of the service request message may further comprise handling the expiration of the service request timer based on a mobility management mode.

Handling the expiration of the service request timer based on a determination of a service type of the service request message and a mobility management mode may further comprise: determining the mobility management mode is an idle mobility management mode and the service type of the service request message is other than an emergency service fallback type, and based on the determining: aborting the service request procedure; releasing locally any allocated resources; selectively incrementing a service request counter, wherein the service request counter is not incremented where the service request procedure is configured to establish a packet data unit session for emergency services, or the apparatus has an established packet data unit session for emergency services, or the apparatus is configured for high priority access, or the service request was in response to a page or notification from a network; based on the service request counter being equal or greater a determined threshold value performing: starting a further timer, wherein the apparatus is configured not to attempt a further service request until an expiration of the further timer unless at least one of: the further service request is in response to a page or notification from a network; the apparatus is configured for high priority access; the further service request is configured to establish a packet data unit session for emergency services; the apparatus has an established packet data unit session for emergency services; the apparatus is registered in a new public land mobile network; and providing to at least one upper layer a notification that the service request was not accepted where the service request was for a management object multimedia telephony voice call.

Handling the expiration of the service request timer based on a determination of a service type of the service request message and a mobility management mode may further comprise: determining the mobility management mode is an connected mobility management mode and the service type of the service request message is other than an emergency service fallback type, and based on the determining: aborting the service request procedure; and setting the apparatus mobility management mode to a connected mode.

The method may further comprise: initiating a service request timer with a defined length value, wherein the defined length value is based on the determination of the service type of the service request message.

According to an fifth aspect there is provided a computer program comprising instructions for causing an apparatus to perform at least the following: determining an expiration of a service request timer generated in association with a service request message from the apparatus; and handling the expiration of the service request timer based on a determination of a service type of the service request message.

According to a sixth aspect there is provided a non-transitory computer readable medium comprising program instructions for causing an apparatus to perform at least the following: determining an expiration of a service request timer generated in association with a service request message from the apparatus; and handling the expiration of the service request timer based on a determination of a service type of the service request message.

According to a seventh aspect, there is provided a computer program comprising instructions for causing an apparatus to perform at least the following: determining an expiration of a service request timer generated in association with a service request message from the apparatus; and handling the expiration of the service request timer based on a determination of a service type of the service request message.

In the above, various aspects have been described. It should be appreciated that further aspects may be provided by the combination of any two or more of the aspects described above.

Various other aspects and further embodiments are also described in the following detailed description and in the attached claims.

BRIEF DESCRIPTION OF THE DRAWINGS

To assist understanding of the present disclosure and to show how some embodiments may be put into effect, reference is made by way of example only to the accompanying drawings in which:

FIG. 7 shows schematically a further third, emergency services fall-back based, handling a timer expiration according to some embodiments as shown in FIG. 3.

DETAILED DESCRIPTION

Some examples may be provided in the context of emergency data sessions.

As discussed above the process by which the UE is configured to transmit a "SERVICE REQUEST" message to the network side and the handling of abnormal cases is one of current discussion.

One "abnormal case" is when a service request timer, defined as T3517 in some discussions expires. The T3517 timer is started whenever the "SERVICE REQUEST" message is sent by the UE, and (normally) stopped when a response from the network is received.

For the case that T3517 expires (in other words the UE does not receive a response from the network) there are defined procedures that the UE may follow. However, until now these procedures are defined only for cases when the service request procedure was invoked by "normal" causes (i.e. pending signalling/data), and not for the case when the service request procedure was invoked because of emergency service fallback (ESFB).

The concept as discussed in further detail hereafter is the provision of suitable timer (T3517) expiration handling (in other words in case the UE does not receive a response from the network) which takes into consideration when the service request procedure has been invoked by emergency services fall back requirements. As discussed in detail hereafter apparatus such as a user equipment implementing such embodiments can handle and prevent failure of an emergency session which could be caused by such timer expiration.

The embodiments as discusses herein describes mechanisms for handling the specific case when a service request procedure is invoked by an emergency service fallback (ESFB) and where the timer (T3517) expires and discloses different ways of trying to establish an emergency session. For example to select a new radio (NR) cell connected to 5G core network (5GCN), then an evolved UTRA (E-UTRA) cell connected to 5GCN, then an E-UTRA cell connected to an evolved packet core (EPC).

Figure 1:
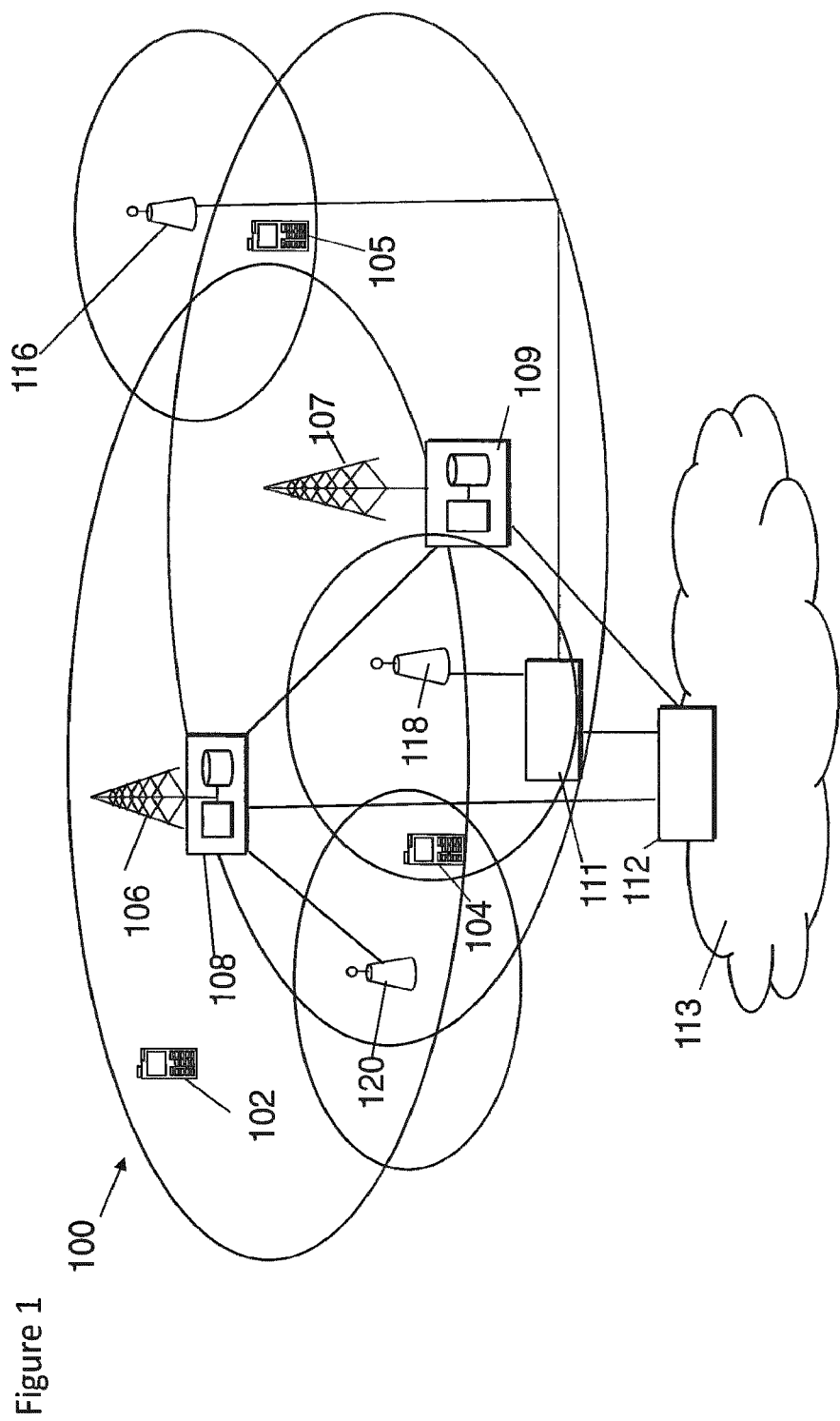
FIG. 1 shows schematically an example of a system within which some embodiments may be employed.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatuses. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. NR may use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An UPF (User Plane Function) whose role is called PSA (PDU Session Anchor) may be responsible for forwarding frames back and forth between the DN (data network) and the tunnels established over the 5G towards the UE(s) exchanging traffic with the DN.

The UPF is controlled by an SMF (Session Management Function) that receives policies from a PCF (Policy Control Function). The CN may also include an AMF (Access & Mobility Function).

Figure 2:
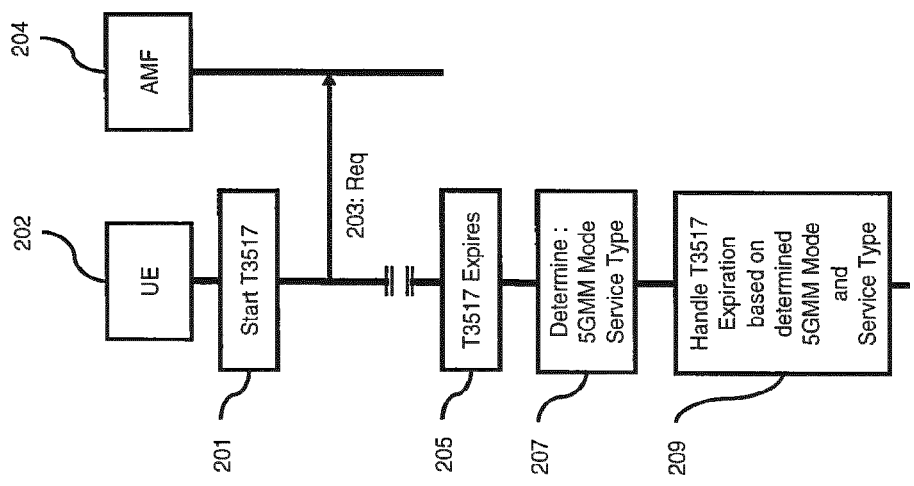
FIG. 2 shows schematically an example of a message flow for requesting a service request and handling a timer expiration according to some embodiments.

FIG. 2 shows an overview of deployed embodiments. In FIG. 2, an UE 202 is configured to start a request timer (also defined as T3517 in the following disclosure). This is shown in FIG. 2 by step 201. The value of the request timer (T3517) may differ based on the reason for transmitting a service request. For example, the default value of T3517 can be 10 seconds if a service request is sent due to emergency service fallback and otherwise, the default value of T3517 can be 15 seconds.

The UE 202 may furthermore be configured to generate and transmit a service request to the access and mobility function (AMF) 204 as shown in step 203.

After a defined time the timer (T3517) expires as shown in FIG. 2 by step 205.

The user equipment 202 is then configured to determine the current 5G mobility management mode (5GMM mode) and also the service request type as shown in FIG. 207. This determination may be explicit in that the UE performs a explicit determination of these parameters or may be implicit in that there is stored within the UE the parameter values which may be retrieved.

The user equipment 202 may then be configured to handle the timer (T3517) expiration based on the service type and furthermore the 5GMM mode (values) as shown in FIG. 2 by step 209.

Figure 3:
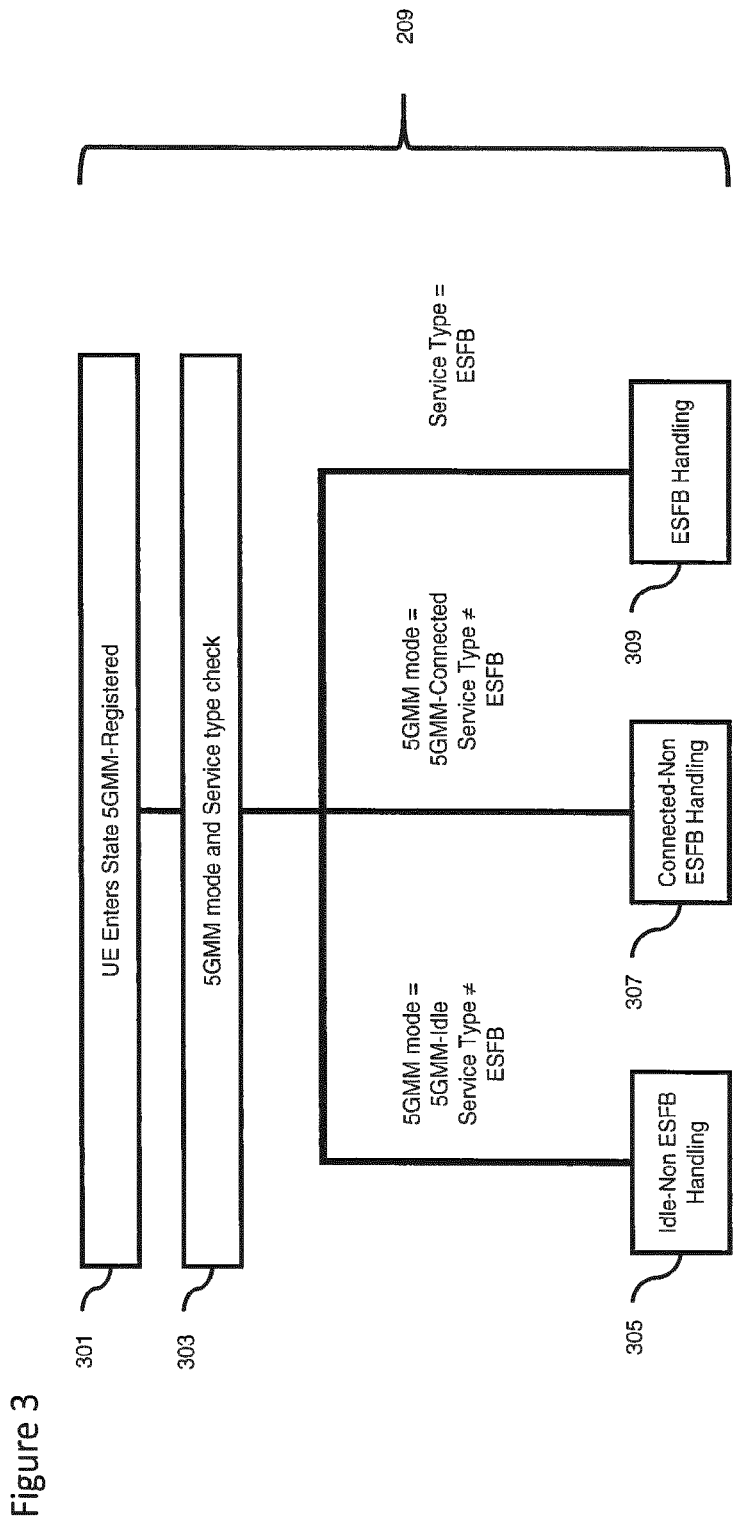
FIG. 3 shows schematically a flow diagram of handling a timer expiration based on 5GMM mode and service type according to some embodiments.

FIG. 3 shows furthermore the handling of the timer (T3517) expiration based on the service type and furthermore the 5GMM mode (values) as shown in FIG. 2 by step 209 in further detail and according to some embodiments.

In some embodiments the handling of the timer expiration causes the UE to enter the state 5GMM-Registered as shown in FIG. 3 by step 301.

Then the UE is configured in some embodiments to perform a 5GMM mode and service type check as shown in FIG. 3 by step 303.

Where the 5GMM mode and service type check determines that the 5GMM mode is a 5GMM-Idle mode and that the service request type is not emergency service fallback then the user equipment may be configured to implement Idle-Non ESFB handling as shown in FIG. 3 by step 305.

Where the 5GMM mode and service type check determines that the 5GMM mode is a 5GMM-connected mode and that the service request type is not emergency service fallback then the user equipment may be configured to implement Connected-Non ESFB handling as shown in FIG. 3 by step 307.

Where the 5GMM mode and service type check determines that the service request type is emergency service fallback then the user equipment may be configured to implement ESFB handling as shown in FIG. 3 by step 309.

Figure 4:
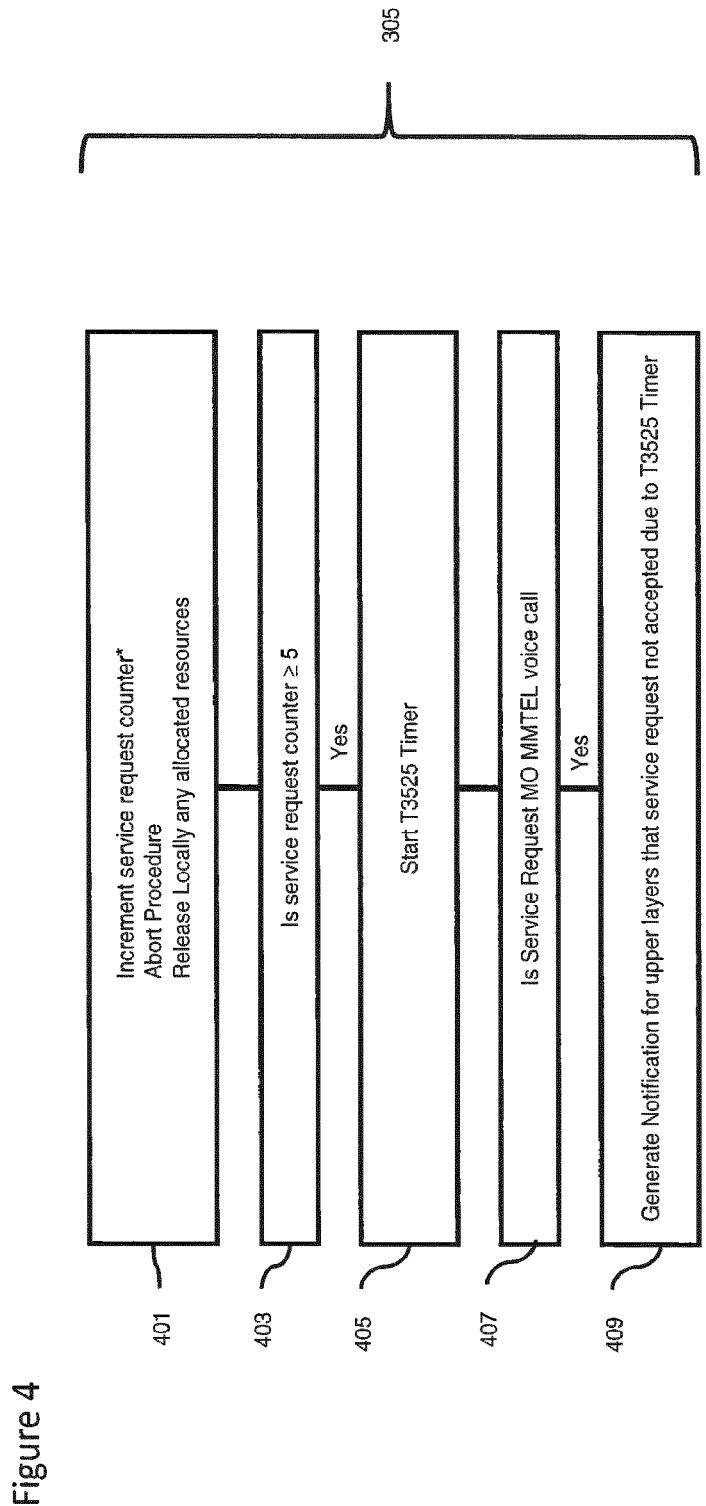
FIG. 4 shows schematically a first part, idle-non emergency services fall-back based, handling a timer expiration based on 5GMM mode and service type according to some embodiments as shown in FIG. 3.

With respect to FIG. 4 the is shown in further detail procedures associated with the Idle-Non ESFB handling as shown in FIG. 3 by step 305.

The user equipment in some embodiments in implementing Idle-Non ESFB handling is configured to increment a service request counter, to abort the procedure and release locally any allocated resources.

If the UE triggered the service request procedure in 5GMM-IDLE mode and the service type of the SERVICE REQUEST message was not set to "emergency services fallback", then the 5GMM sublayer shall increment the service request attempt counter subject the exclusions noted below, abort the procedure and release locally any resources allocated for the service request procedure as shown in FIG. 4 by step 401.

In some embodiments the service request attempt counter is not incremented where the service request procedure is initiated to establish a PDU session for emergency services or the UE has a PDU session for emergency services established or the UE is a UE configured for high priority access in selected PLMN or the service request is initiated in response to paging or notification from the network.

In some embodiments the UE is then configured to check whether the service request attempt counter is greater than or equal to 5 as shown in FIG. 4 by step 403.

When the service request attempt counter is greater than or equal to 5, the UE is configured to start a further timer (this timer may be defined as timer T3525 in the following disclosure) as shown in FIG. 4 by step 405.

Furthermore in some embodiments the UE is configured to determine whether the service request was initiated for a management object (MO) multimedia telephony (MMTEL) voice call as shown in FIG. 4 by step 407. Where the service request was a MO MMTEL voice call then the UE is configured to generate a notification that the service request was not accepted due to the UE having started the further timer (T3525) is provided to the upper layers as shown in FIG. 4 by step 409. In some embodiments this can result in the upper layers requesting implementation specific mechanisms, for example the MMTEL voice call being attempted to another internet property connectivity access network (IP-CAN), or establishment of a circuit switched (CS) voice call (if supported and not already attempted in the CS domain).

In some embodiments the UE is configured to not attempt a service request until expiry of the further timer (T3525) unless one of the following conditions are met:

1) the service request is initiated in response to paging or notification from the network;
2) the UE is a UE configured for high priority access in selected PLMN;
3) the service request is initiated to establish a protocol data unit (PDU) session for emergency services;
4) the UE has a PDU session for emergency services established; or
5) the UE is registered in a new public land mobile network (PLMN).

In some embodiments the non-access stratum (NAS) signalling connection can also be released if the UE deems that the network has failed an authentication check.

Figure 5:
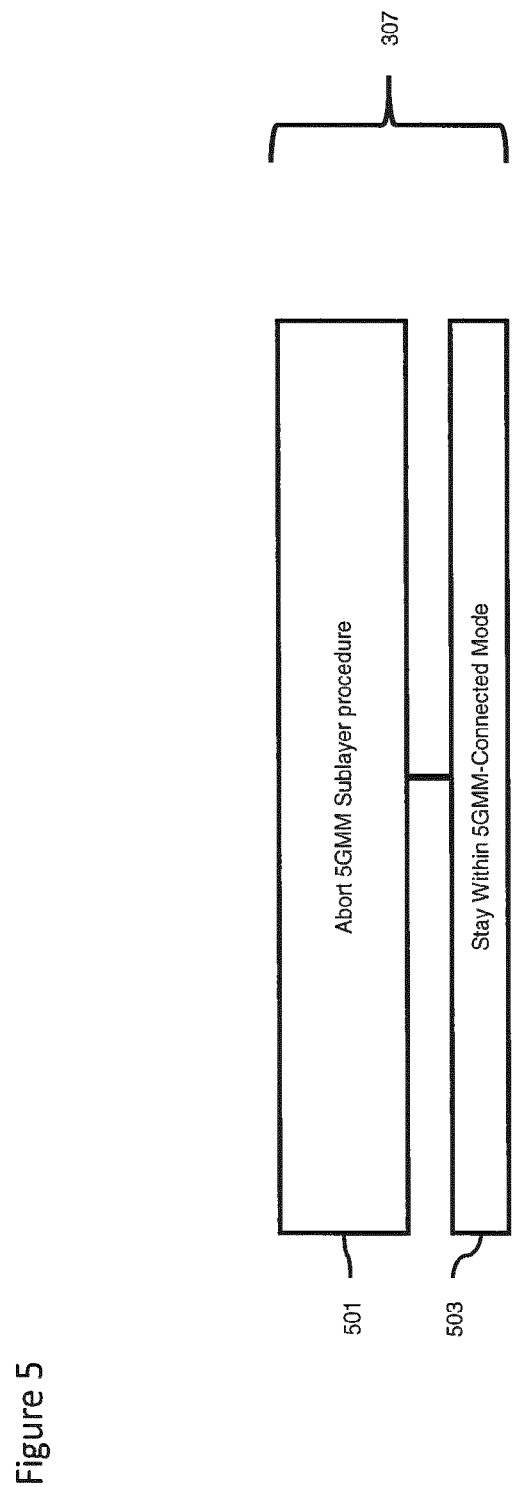
FIG. 5 shows schematically a second part, connected-non emergency services fall-back based, handling a timer expiration based on 5GMM mode and service type according to some embodiments as shown in FIG. 3.

With respect to FIG. 5 the is shown in further detail procedures associated with the Connected-Non ESFB handling as shown in FIG. 3 by step 307.

The user equipment in some embodiments in implementing Connected-Non ESFB handling is configured to abort a 5GMM Sublayer procedure as shown in FIG. 5 by step 501.

The user equipment in some embodiments is further configured to stay within the 5GMM-connected mode as shown in FIG. 5 by step 503.

Figure 6:
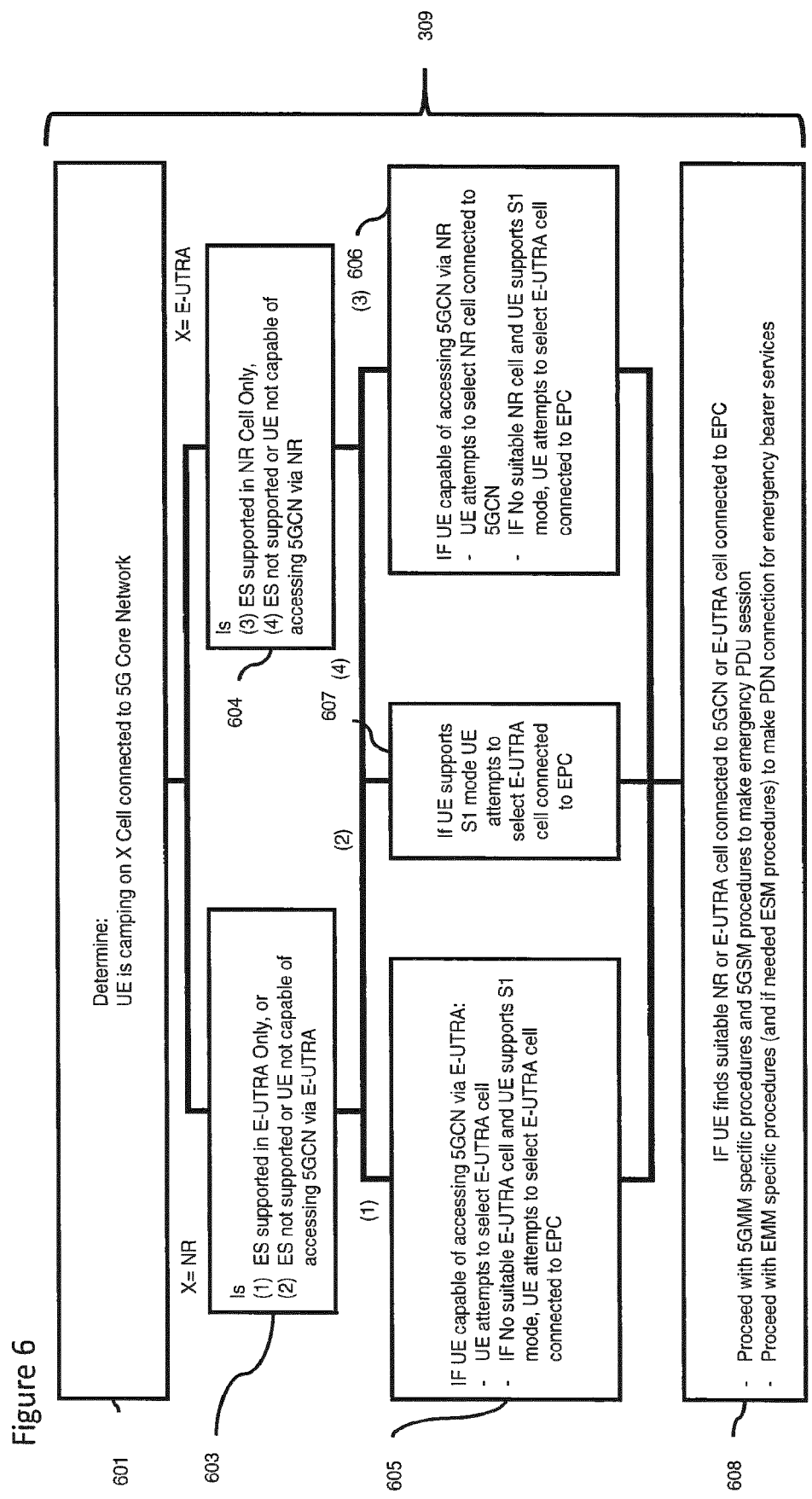
FIG. 6 shows schematically a third, emergency services fall-back based, handling a timer expiration according to some embodiments as shown in FIG. 3.

With respect to FIG. 6 the is shown in further detail a first set of example procedures associated with the ESFB handling as shown in FIG. 3 by step 309.

The user equipment in some embodiments in implementing Connected-Non ESFB handling is configured to determine which type of cell the UE is camping on when connected to the 5G Core Network as shown in FIG. 6 by step 601.

Where the UE is camping on an NR cell connected to 5GCN then the UE is configured to determine whether an emergency services support indicator for 3GPP access indicates "emergency services supported in E-UTRA connected to 5GCN only" or option (1). Otherwise the UE may be configured to determine whether an emergency services support indicator for 3GPP access indicates "emergency services not supported" or UE is not capable of accessing 5GCN via E-UTRA or option (2). The determinations may be shown in FIG. 6 by step 603.

Where the determination is option (1) emergency services support indicator for 3GPP access indicates "emergency services supported in E-UTRA connected to 5GCN only" then the UE is configured to determine whether it is capable of accessing 5GCN via E-UTRA and if so then the UE is further configured to attempt to select an E-UTRA cell connected to 5GCN.

If the UE does not find a suitable E-UTRA cell connected to 5GCN and the UE supports S1 mode, then the UE is configured to attempt to select an E-UTRA cell connected to the evolved packet core (EPC).

These operations are shown in FIG. 6 by step 605.

Where the determination is option (2), where the emergency services support indicator for 3GPP access indicates "emergency services not supported" or the UE is not capable of accessing 5GCN via E-UTRA and if the UE supports S1 mode, the UE shall attempt to select an E-UTRA cell connected to EPC as shown in FIG. 6 by step 607. Here, even if the emergency services support indicator for 3GPP access indicates "emergency services not supported", the UE may choose to attempt to select an E-UTRA cell connected to 5GCN if the UE is capable of accessing 5GCN via E-UTRA and the emergency service fallback indicator for 3GPP access indicates "Emergency services fallback supported in NR connected to 5GCN and E-UTRA connected to 5GCN" in order to perform ESFB in an E-UTRA cell connected to 5GCN. In this case, if the UE does not find a suitable E-UTRA cell connected to 5GCN and the UE supports S1 mode, then the UE is configured to attempt to select an E-UTRA cell connected to the EPC.

Where the UE is camping on an E-UTRA cell connected to 5GCN then the UE is configured to determine whether an emergency services support indicator for 3GPP access indicates "emergency services supported in E-UTRA connected to NR only" or option (3). Otherwise the UE may be configured to determine whether an emergency services support indicator for 3GPP access indicates "emergency services not supported" or UE is not capable of accessing 5GCN via NR or option (4). The determinations may be shown in FIG. 6 by step 604.

Where the determination is option (3) emergency services support indicator for 3GPP access indicates "emergency services supported in NR connected to 5GCN only" then the UE is configured to determine whether it is capable of accessing 5GCN via NR and if so then the UE is further configured to attempt to select an NR cell connected to 5GCN.

If the UE does not find a suitable NR cell connected to 5GCN and the UE supports S1 mode, then the UE is configured to attempt to select an E-UTRA cell connected to the evolved packet core (EPC).

These operations are shown in FIG. 6 by step 606.

Where the determination is option (4), where the emergency services support indicator for 3GPP access indicates "emergency services not supported" or the UE is not capable of accessing 5GCN via NR and if the UE supports S1 mode, the UE shall attempt to select an E-UTRA cell connected to EPC as shown in FIG. 6 by step 607. Here, even if the emergency services support indicator for 3GPP access indicates "emergency services not supported", the UE may choose to attempt to select an NR cell connected to 5GCN if the UE is capable of accessing 5GCN via NR and the emergency service fallback indicator for 3GPP access indicates "Emergency services fallback supported in NR connected to 5GCN and E-UTRA connected to 5GCN" in order to perform ESFB in an NR cell connected to 5GCN. In this case, if the UE does not find a suitable NR cell connected to 5GCN and the UE supports S1 mode, then the UE is configured to attempt to select an E-UTRA cell connected to the EPC.

If the UE finds a suitable NR cell connected to 5GCN, E-UTRA cell connected to 5GCN or E-UTRA cell connected to EPC the UE is then configured to:

proceed with appropriate 5GMM specific procedures and 5GSM procedures to make an emergency PDU session; or proceed with appropriate EPS mobility management (EMM) specific procedures and, if necessary, EPS session management (ESM) procedures to make a packet data network (PDN) connection for emergency bearer services.

The proceeding with appropriate 5GMM or EMM/ESM procedures is shown in FIG. 6 by step 608.

With respect to FIG. 7 is shown a further set of example procedures associated with the ESFB handling as shown in FIG. 3 by step 309.

The user equipment in some embodiments in implementing Connected-Non ESFB handling is configured to select an NR cell connected to 5GCN, E-UTRA cell connected to 5GCN, or an E-UTRA cell connected to EPC based on at least one of the followings:

1) the emergency services support indicator for 3GPP access;
2) the radio access technology of the current cell (either E-UTRA or NR);
3) the UE's capability to access 5GCN via E-UTRA;
4) the UE's support for S1 mode;
5) availability of a suitable NR cell connected to 5GCN, E-UTRA cell connected to 5GCN or E-UTRA cell connected to EPC; and
6) the emergency service fallback indicator for 3GPP access.

The selection of NR cell connected to 5GCN, E-UTRA cell connected to 5GCN, or an E-UTRA cell connected to EPC is shown in FIG. 7 by step 701.

If the UE finds a suitable NR cell connected to 5GCN, E-UTRA cell connected to 5GCN or E-UTRA cell connected to EPC the UE is then configured to:

proceed with appropriate 5GMM specific procedures and 5GSM procedures to make an emergency PDU session; or proceed with appropriate EPS mobility management (EMM) specific procedures and, if necessary, EPS session management (ESM) procedures to make a packet data network (PDN) connection for emergency bearer services.

The proceeding with appropriate 5GMM or EMM/ESM procedures is shown in FIG. 7 by step 608.

In some embodiments the UE may be further configured to control other aspects based on the abnormal event determination.

Figure 8:
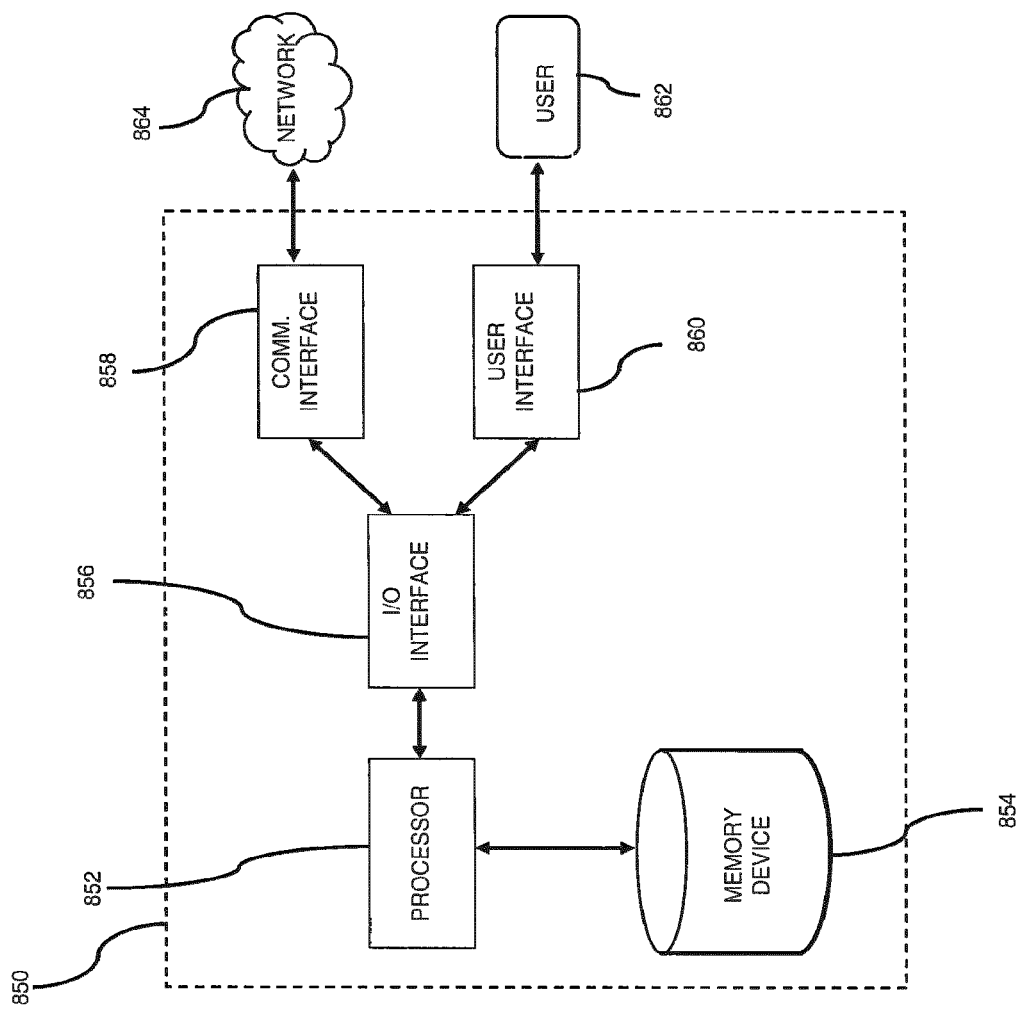
FIG. 8 shows schematically an example of an apparatus suitable for implementing the handling of the timer expiration according to some embodiments.

FIG. 8 shows an example apparatus 850 in which embodiments of the invention may be applied. Apparatus 850 may be an element of the system shown in FIG. 1. In some example embodiments, the apparatus 850 may, be embodied as, or included as a component of, a communications device with wired or wireless communications capabilities. The example apparatus may include or otherwise be in communication with one or more processors 852, memory devices 854, Input/Output (I/O) interfaces 856, communications interfaces 858 and/or user interfaces 860 (in FIG. 8, one of each is shown as an example). Depending on the component of FIG. 1 being implemented by the apparatus, however, the apparatus may include additional elements and/or may not include one or more of the foregoing elements, such as the user interfaces.

Apparatus 850 may be a user equipment.

The processor 852 may be embodied as various means for implementing the various functionalities of example embodiments of the present invention including, for example, one or more of a microprocessor, a coprocessor, a controller, a special-purpose integrated circuit such as, for example, an ASIC (application specific integrated circuit), an FPGA (field programmable gate array), DSP (digital signal processor), or a hardware accelerator, processing circuitry or other similar hardware. According to one example embodiment, the processor may be representative of a plurality of processors, or one or more multi-core processors, operating individually or in concert.

Whether configured as hardware alone or via instructions stored on a computer-readable storage medium, or by a combination thereof, the processor 652 may be an apparatus configured to perform operations according to embodiments of the present invention while configured accordingly. Thus, in example embodiments where the processor is embodied as, or is part of, an ASIC, FPGA, or the like, the processor is specifically configured hardware for conducting the operations described herein.

Alternatively, in examples where the processor is an executor of instructions stored on a computer-readable storage medium, the instructions specifically configure the processor to perform the algorithms and operations described herein. In some example embodiments, the processor is a processor of a specific device configured for employing example embodiments of the present invention by further configuration of the processor via executed instructions for performing the algorithms, methods, and operations described herein.

The memory device 854 may be one or more computer-readable storage media that may include volatile and/or non-volatile memory. In some example embodiments, the memory device may include Random Access Memory (RAM) including dynamic and/or static RAM, on-chip or off-chip cache memory, and/or the like. Further, the memory device may include non-volatile memory, which may be embedded and/or removable, and may include, for example, Read-Only Memory (ROM), flash memory, magnetic storage devices (for example, hard disks, floppy disk drives, magnetic tape, etc.), optical disc drives and/or media, non-volatile random access memory (NVRAM), and/or the like. The memory device may include a cache area for temporary storage of data. In this regard, at least a portion or the entire memory device may be included within the processor 852.

Further, the memory device 854 may be configured to store information, data, applications, computer-readable program code instructions, and/or the like for enabling the processor 852 and the example apparatus 850 to carry out various functions in accordance with example embodiments of the present invention described herein. For example, the memory device may be configured to buffer input data for processing by the processor. Additionally, or alternatively, the memory device may be configured to store instructions for execution by the processor. The memory may be securely protected, with the integrity of the data stored therein being ensured. In this regard, data access may be checked with authentication and authorized based on access control policies.

The I/O interface 856 may be any device, circuitry, or means embodied in hardware, software or a combination of hardware and software that is configured to interface the processor 852 with other circuitry or devices, such as the communications interface 858 and/or the user interface 860. In some example embodiments, the processor may interface with the memory device via the I/O interface. The I/O interface may be configured to convert signals and data into a form that may be interpreted by the processor. The I/O interface may also perform buffering of inputs and outputs to support the operation of the processor. According to some example embodiments, the processor and the I/O interface may be combined onto a single chip or integrated circuit configured to perform, or cause the apparatus 202 to perform, various functionalities of an example embodiment.

The communication interface 858 may be any device or means embodied in hardware, software or a combination of hardware and software that is configured to receive and/or transmit data from/to one or more networks 864 and/or any other device or module in communication with the example apparatus 850. The processor may also be configured to facilitate communications via the communications interface by, for example, controlling hardware included within the communications interface. In this regard, the communication interface may include, for example, one or more antennas, a transmitter, a receiver, a transceiver and/or supporting hardware, including, for example, a processor for enabling communications. Via the communication interface, the example apparatus may communicate with various other network elements in a device-to-device fashion and/or via indirect communications.

The communications interface 858 may be configured to provide for communications in accordance with any of a number of wired or wireless communication standards. The communications interface may be configured to support communications in multiple antenna environments, such as multiple input multiple output (MI MO) environments. Further, the communications interface may be configured to support orthogonal frequency division multiplexed (OFDM) signalling. In some example embodiments, the communications interface may be configured to communicate in accordance with various techniques including, as explained above, any of a number of second generation (2G), third generation (3G), fourth generation (4G) or higher generation mobile communication technologies, radio frequency (RF), or any of a number of different wireless networking techniques. The communications interface may also be configured to support communications at the network layer, possibly via Internet Protocol (IP). The user interface 860 may be in communication with the processor 852 to receive user input from a user 862 via the user interface and/or to present output to a user as, for example, audible, visual, mechanical or other output indications. The user interface may include, for example, a keyboard, a mouse, a joystick, a display (for example, a touch screen display), a microphone, a speaker, or other input/output mechanisms. Further, the processor may comprise, or be in communication with, user interface circuitry configured to control at least some functions of one or more elements of the user interface. The processor and/or user interface circuitry may be configured to control one or more functions of one or more elements of the user interface through computer program instructions (for example, software and/or firmware) stored on a memory accessible to the processor (for example, the memory device 854). In some example embodiments, the user interface circuitry is configured to facilitate user control of at least some functions of the apparatus 850 through the use of a display and configured to respond to user inputs. The processor may also comprise, or be in communication with, display circuitry configured to display at least a portion of a user interface, the display and the display circuitry configured to facilitate user control of at least some functions of the apparatus.

In some cases, the apparatus 850 may be implemented in a chip or chip set. In an example embodiment, the chip or chip set may be programmed to perform one or more operations of one or more methods as described herein and may include, for instance, one or more processors 852, memory devices 854, I/O interfaces 856 and/or other circuitry components incorporated in one or more physical packages (for example, chips). By way of example, a physical package may include an arrangement of one or more materials, components, and/or wires on a structural assembly (for example, a baseboard) to provide one or more characteristics such as physical strength, conservation of size, and/or limitation of electrical interaction. It is contemplated that in certain embodiments the chip or chip set can be implemented in a single chip. It is further contemplated that in certain embodiments the chip or chip set can be implemented as a single "system on a chip." It is further contemplated that in certain embodiments a separate ASIC may not be used, for example, and that all relevant operations as disclosed herein may be performed by a processor or processors. A chip or chip set, or a portion thereof, may constitute a means for performing one or more operations of one or more methods as described herein.

In general, the various examples shown may be implemented in hardware or in special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out methods are described in the present disclosure. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the disclosed embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. An apparatus, comprising:
   at least one processor; and
   at least one memory including computer program code;
   the at least one memory and the computer program code configured to, with the at least one processor, cause the apparatus to perform:
   transmitting a service request message;
   starting a service request timer when the service request message is transmitted;
   determining an expiration of the service request timer;
   handling the expiration of the service request timer based on a service type of the service request message and based on a mobility management mode;
   determining the service type of the service request message and for, when the service type of the service request message is the emergency service fallback type:
   determining the apparatus is camping on a new radio cell connected to a 5G core network, an emergency service support indicator for access indicates that emergency services are supported in evolved universal terrestrial radio access connected to the 5G core network only, and the apparatus is capable of accessing the 5G core network via the evolved universal terrestrial radio access;
   attempting to select an evolved universal terrestrial radio access cell connected to the 5G core network based on the determining; and
   when the apparatus is unable to select an evolved universal terrestrial radio access cell connected to the 5G core network, attempting to select an evolved universal terrestrial radio access cell connected to an evolved packet core when the apparatus is configured to support S1 mode.

2. The apparatus as claimed in claim 1, wherein the at least one memory and the computer program code are further configured to, with the at least one processor, cause the apparatus to perform: when the service type of the service request message is an emergency service fallback type, initiating at least one emergency service access; and
   when the service type of the service request message is other than the emergency service fallback type, handling the expiration of the service request timer otherwise.

3. An apparatus, comprising:
   at least one processor; and
   at least one memory including computer program code;
   the at least one memory and the computer program code configured to, with the at least one processor, cause the apparatus to perform:
   transmitting a service request message;
   starting a service request timer when the service request message is transmitted;
   determining an expiration of the service request timer;
   handling the expiration of the service request timer based on a service type of the service request message and based on a mobility management mode;
   determining the service type of the service request message and for, when the service type of the service request message is the emergency service fallback type:
   determining the apparatus is camping on an evolved universal terrestrial radio access cell connected to a 5G core network, an emergency service support indicator for access indicates that emergency services are supported in new radio connected to the 5G core network only, and the apparatus is capable of accessing the 5G core network via a new radio;
   attempting to select a new radio cell connected to the 5G core network based on the determining; and
   when the apparatus is unable to select a new radio cell connected to the 5G core network, attempting to select an evolved universal terrestrial radio access cell connected to an evolved packet core when the apparatus is configured to support S1 mode.

4. The apparatus as claimed in claim 1, wherein the at least one memory and the computer program code are further configured to, with the at least one processor, cause the apparatus to perform:
   determining the service type of the service request message, and for, when the service type is the emergency service fallback type:
   attempting to select one of: a new radio cell connected to a 5G core network; an evolved universal terrestrial radio access cell connected to the 5G core network; and evolved universal terrestrial radio access cell connected to an evolved packet node further based on at least one of:
   an emergency service support indicator for 3GPP access;
   a radio access technology of the apparatus' current cell;
   a capability to access the 5G core network via evolved universal terrestrial radio access;
   support for S1 mode;
   availability of a suitable new radio cell connected to the 5G core network, evolved universal terrestrial radio access cell connected to the 5G core network, or evolved universal terrestrial radio access cell connected to an evolved packet core; and
   an emergency service fallback indicator for 3GPP access.

5. The apparatus as claimed in claim 1, wherein the at least one memory and the computer program code are further configured to, with the at least one processor, cause the apparatus to perform:
  performing 5G mobility management specific procedures and 5G service management procedures to make an emergency packet data unit session based on determining a suitable selection of the new radio cell connected to the 5G core network or the evolved universal terrestrial radio access cell connected to the 5G core network; or
  performing evolved packet system mobility management specific procedures and evolved packet system service management procedures to make a packet data network connection for emergency bearer services based on determining a suitable selection of the evolved universal terrestrial radio access cell connected to the evolved packet core.

6. An apparatus, comprising:
  at least one processor; and
  at least one memory including computer program code;
  the at least one memory and the computer program code configured to, with the at least one processor, cause the apparatus to perform:
  transmitting a service request message;
  starting a service request timer when the service request message is transmitted;
  determining an expiration of the service request timer;
  handling the expiration of the service request timer based on a service type of the service request message and based on a mobility management mode;
  determining the service type of the service request message and the mobility management mode and for, when the service type of the service request message is other than an emergency service fallback type and the mobility management mode is an idle mobility management mode:
  aborting the service request procedure;
  releasing locally any allocated resources;
  selectively incrementing a service request attempt counter, wherein the service request attempt counter is not incremented when the service request procedure is configured to establish a packet data unit session for emergency services, or the apparatus has an established packet data unit session for emergency services, or the apparatus is configured for high priority access, or the service request was in response to a paging or notification from a network; and
  based on the service request attempt counter being equal or greater a determined threshold value performing;
  starting a further timer, wherein the apparatus is configured not to attempt a further service request until an expiration of the further timer unless at least one of:
  the further service request is in response to a paging or notification from a network;
  the apparatus is configured for high priority access;
  the further service request is configured to establish a packet data unit session for emergency services;
  the apparatus has an established packet data unit session for emergency services;
  the apparatus is registered in a new public land mobile network; and
  when the service request was for a management object multimedia telephony voice call, providing to at least one upper layer a notification that the service request was not accepted.

7. The apparatus as claimed in claim 6, wherein the at least one memory and the computer program code are further configured to, with the at least one processor, cause the apparatus to perform:
  determining the service type of the service request message and the mobility management mode, and for, when the service type of the service request message is other than an emergency service fallback type and the mobility management mode is a connected mobility management mode:
  aborting the service request procedure; and
  staying in the connected mobility management mode.

8. The apparatus as claimed in claim 1, the at least one memory and the computer program code are further configured to, with the at least one processor, cause the apparatus to perform:
  initiating the service request timer with a defined length value, wherein the defined length value is based on the service type of the service request message.

9. A method, comprising:
  transmitting a service request message;
  starting a service request timer when the service request message is transmitted;
  determining an expiration of the service request timer; and
  handling the expiration of the service request timer based on a service type of the service request message and based on a mobility management mode, wherein the handling the expiration of the service request timer based the service type of the service request message further comprises:
  determining the service type of the service request message and, when the service type of the service request message is the emergency service fallback type:
  determining an apparatus is camping on a new radio cell connected to a 5G core network, an emergency service support indicator for access indicates that emergency services are supported in evolved universal terrestrial radio access connected to the 5G core network only and the apparatus is capable of accessing the 5G core network via the evolved universal terrestrial radio access;
  attempting to select an evolved universal terrestrial radio access cell connected to the 5G core network based on the determining; and
  when the apparatus is unable to select an evolved universal terrestrial radio access cell connected to the 5G core network, attempting to select an evolved universal terrestrial radio access cell connected to an evolved packet core when the apparatus is configured to support S1 mode.

10. The method as claimed in claim 9, wherein the handling the expiration of the service request timer based on the service type of the service request message further comprises:
  when the service type of the service request message is an emergency service fallback type, initiating at least one emergency service access; and
  when the service type of the service request message is other than the emergency service fallback type, handing the expiration of the service request timer otherwise.

11. A method, comprising:
  transmitting a service request message;
  starting a service request timer when the service request message is transmitted;

determining an expiration of the service request timer; and handling the expiration of the service request timer based on a service type of the service request message and based on a mobility management mode, wherein the handling the expiration of the service request timer based on a service type of the service request message further comprises:

determining the service type of the service request message and, when the service type of the service request message is the emergency service fallback type:

determining the apparatus is camping on an evolved universal terrestrial radio access cell connected to a 5G core network, an emergency service support indicator for access indicates that emergency services are supported in new radio connected to the 5G core network only, and the apparatus is capable of accessing the 5G core network via a new radio;

attempting to select a new radio cell connected to the 5G core network based on the determining; and when the apparatus is unable to select a new radio cell connected to the 5G core network, attempting to select an evolved universal terrestrial radio access cell connected to an evolved packet core when the apparatus is configured to support S1 mode.

12. A method, comprising:

transmitting a service request message;

starting a service request timer when the service request message is transmitted;

determining an expiration of the service request timer; and handling the expiration of the service request timer based on a service type of the service request message and based on a mobility management mode, wherein the handling the expiration of the service request timer based on the service type of the service request message and the mobility management mode further comprises:

determining the service type of the service request message and the mobility management mode and, when the service type of the service request message is other than an emergency service fallback type and the mobility management mode is an idle mobility management mode:

aborting the service request procedure;

releasing locally any allocated resources;

selectively incrementing a service request attempt counter, wherein the service request attempt counter is not incremented when the service request procedure is configured to establish a packet data unit session for emergency services, or the apparatus has an established packet data unit session for emergency services, or the apparatus is configured for high priority access, or the service request was in response to a paging or notification from a network; and based on the service request attempt counter being equal or greater a determined threshold value performing;

starting a further timer, wherein the apparatus is configured not to attempt a further service request until an expiration of the further timer unless at least one of:

the further service request is in response to a paging or notification from a network;

the apparatus is configured for high priority access;

the further service request is configured to establish a packet data unit session for emergency services;

the apparatus has an established packet data unit session for emergency services;

the apparatus is registered in a new public land mobile network; and when the service request was for a management object multimedia telephony voice call, providing to at least one upper layer a notification that the service request was not accepted.

13. A computer program embodied on a non-transitory computer-readable medium, said computer program comprising program code configured to perform the method according to claim 9, when the computer program product is executed on a computer.

* * * * *